May 13, 1952 — E. KOLEHMAINEN — 2,596,252
AMMUNITION LINK EJECTION CHUTE
Filed Oct. 24, 1949
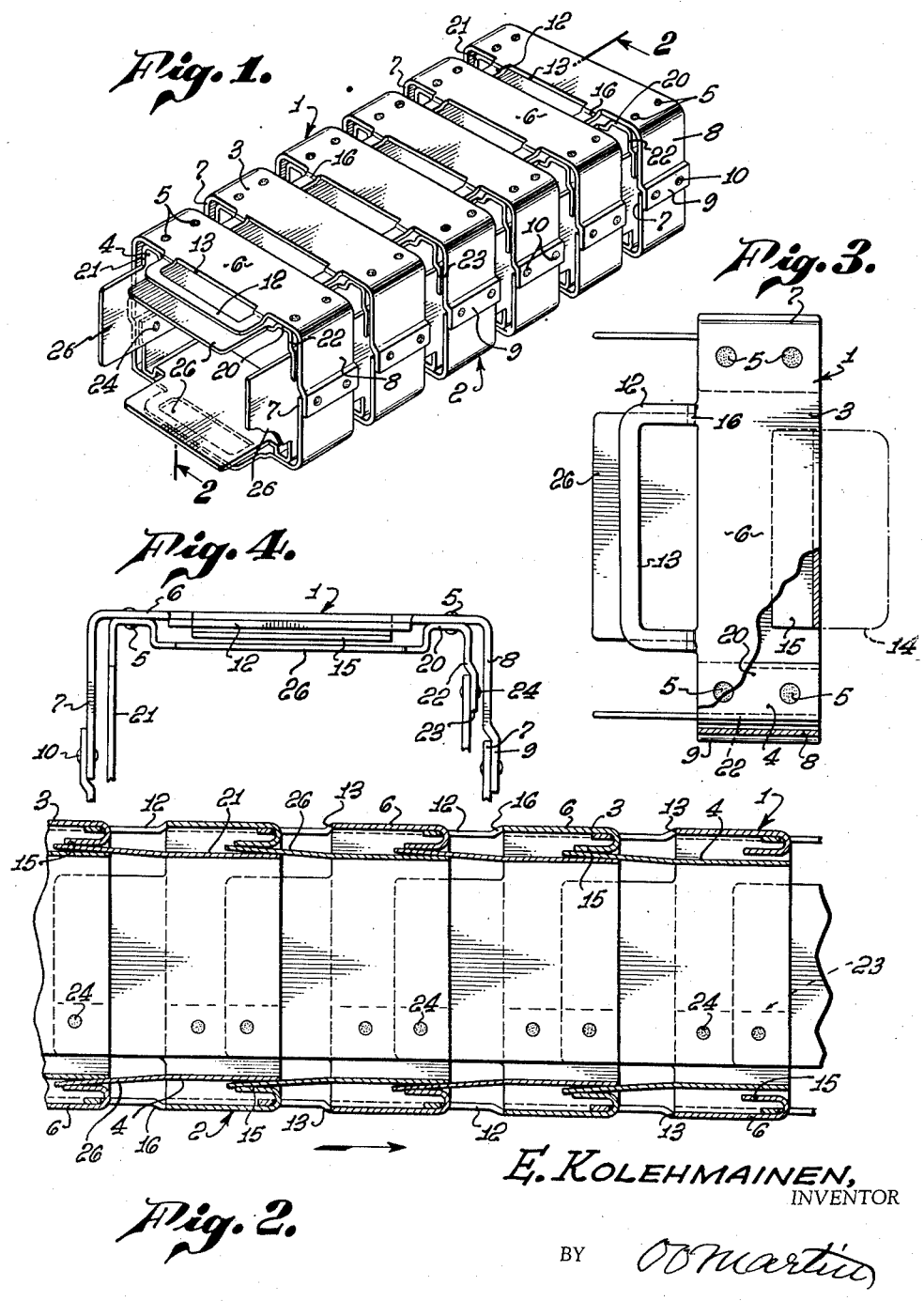
E. KOLEHMAINEN, INVENTOR
BY O. O. Martin
ATTORNEY Patented May 13, 1952

2,596,252

UNITED STATES PATENT OFFICE 2,596,252

AMMUNITION LINK EJECTION CHUTE

Elmar Kolehmainen, Los Angeles, Calif.

Application October 24, 1949, Serial No. 123,131

5 Claims. (Cl. 193—25)

This invention relates to flexible chutes such as provided to guide ammunition material to or from the type of automatic guns installed in military airplnaes and is an improvement on the device described in my copending application, Ser. No. 39,471, now abandoned.

In the present device, as in said earlier application, certain features are held essential to efficient and dependable transfer of parts to or from such guns. One essential feature being that the interior of the chute must present a continuous, smooth and unbroken surface along which the ammunition material may slide without encountering any obstructions during the passage therethrough. Another essential feature is that the chute must be capable of considerable flexing without disturbing or obstructing the smoothness of the passage therethrough. Finally, it is considered absolutely essential that the links of the chute be made individually separable and capable of reassembly without having to reach into or in any way affecting the interior passage through the chute and also without having to resort to special tools for this purpose or to bending the interlocking parts of the links out of shape and so destroying the utility thereof.

In my copending application, separate elements are employed to effect inter-engagement and separation of the links of the chute. It is the object of the present invention entirely to eliminate such extra parts and so to design and construct the links of the chute that inter-engagement or separation thereof may be effected by simple and convenient manipulation of exterior portions of the links and without reaching into or in any way disturbing the interior passage through the links.

These objects, as well as the advantageous features of the invention will be appreciated upon perusal of the following detailed description and referring to the accompanying drawing forming part thereof.

In the drawing:

Fig. 1 illustrates, in perspective, a series of interconnected links of an ammunition chute embodying the invention;

Fig. 2 is a side elevational view of the chute taken substantially through the center thereof in the directions of the arrows 2—2 of Fig. 1;

Fig. 3 is a plan view of one of the links of the chute; and

Fig. 4 is a substantially corresponding end view of the upper portion of one of the links.

As illustrated in the drawing, each link of the chute consists of two half-portions which, in order to facilitate this description, are referred to as the upper link portion 1 and the lower link portion 2. As these parts may be and preferably are exactly alike, detailed description of one refers equally to the other.

Each link half-portion includes an outer frame member 3 and an inner frame member 4, which frame members are rigidly fastened together in any suitable manner, preferably by a spot welding operation as indicated at 5 in the drawing. The outer frame member consists of a horizontal plate 6 and vertically directed ears 7, 8. The ear 8 is relatively long and the outer end thereof is offset, as indicated at 9, to receive therein the shorter ear 7 of the other half-portion of the link whereupon the two portions are rigidly fastened together, as by a spot welding operation. This means of fastening is indicated at 10 in Fig. 1. Projecting from one edge of the horizontal plate 6 is a loop-shaped flange 12 having a rectangular perforation 13 therethrough and the inner edge of this perforation is in continued alignment with the edge of the plate.

A second flange 14 projects from the opposite edge of the plate and it is bent back beneath the plate to form a hook 15 in registration with and slightly narrower than the perforation 13. This hook, or rather the two hooks at the top and the bottom of the link, are manually inserted through the perforations 13 of the loops of the next following link to lock the adjacent links together. It is important to note that the flanges 12 are sufficiently depressed, as best indicated at 16 in Fig. 2, to come to rest against the underside of the plates 6.

The inner frame is similarly composed of identically shaped parts, each including a horizontal member 20 from which project ears 21, 22. The latter is shown offset at 23 to receive therein the end of the ear 21 of the companion part of the link. The inner frame parts are similarly tied together, as by spot welding 24, before this frame is secured in position within the outer frame. It is important to note that the offset portion 9 of the outer frame is moved beyond the offset portion 23 of the inner frame in order vertically to separate the overlapping joints of the two frames and so to assure freedom of relative movement of adjacent links. It is furthermore important to note that the ear 21 of each inner frame portion is extended endwise, as indicated at 26 in Fig. 2, to form a flange overlapping the ear 21 of the next following link and so to provide continuous, smooth, unbroken sidewalls within the inner frame in the direction of travel of the ammunition material passing through the chute as designated by the arrow of Fig. 2.

It is seen from the foregoing description and by referring to the drawings that I have provided an extremely simple and inexpensive ammunition chute assembly the links of which may be combined and separated by convenient, external manipulation thereof without having to resort to special tools or the use of extra parts. It is also important to note that the chute is capable of considerable flexing and that neither such flexing nor the joining or separation of the links thereof in any way affects the inner lining of the chute.

I claim:

1. A chute for guiding ammunition material comprising a series of interengaging links, each link being made from identically formed half-portions rigidly fastened together to form an outer frame and an inner frame, the inner surface of said inner frame presenting a complete smooth and unbroken guide passage for the ammunition material, the outer frame having elements extending from the ends thereof for engagement with identical elements of the next following link.

2. A chute for guiding ammunition material comprising a series of interengaging links, each link being made from identically formed upper and lower half-portions rigidly fastened together to form an outer frame and an inner frame, the inner surface of said inner frame presenting a complete smooth and unbroken guide passage for the ammunition material, the outer frame having at the top and bottom centrally positioned hook-shaped elements projecting from one end thereof and loop-shaped flanges extending from the other end thereof in continued alignment with said elements for receiving the elements of the next following link thereby to interconnect said links.

3. A chute for guiding ammunition material comprising a series of interengaging links, each link being made from identically formed half-portions rigidly fastened together at the sides thereof to form complete outer and inner frames, the inner surface of said inner frame presenting a complete smooth and unbroken guide passage for the ammunition material, the outer frame having at the top and bottom a centrally positioned inwardly curved hook-shaped element projecting from one end thereof and an alined loop-shaped flange extending from the top and bottom at the other end thereof for receiving the elements of the next following link to interconnect the two links, the said flanges being slightly inwardly offset to rest against the inner surface of the outer frame.

4. A chute for guiding ammunition material comprising a series of interengaging links, each link being made from identically formed half-portions rigidly fastened together at the sides thereof to form complete outer and inner frames, the inner surface of said inner frame presenting a complete smooth and unbroken guide passage for the ammunition material, the outer frame having at the top and bottom a centrally positioned hook-shaped element projecting from one end thereof and a loop-shaped flange extending from the top and bottom at the other end thereof for receiving the elements of the next following link to interconnect the two links, the top and bottom walls of the inner frame being inwardly recessed to afford ample space for said interengaging elements and flanges, the side walls of said inner frame being extended at one end thereof to form ears overlapping the inner side walls of the next following link.

5. A chute for guiding ammunition material comprising a series of interengaging links, each link being made from identically formed half-portions overlapping at the side edges of the links, the overlapping portions being relatively staggered and rigidly fastened together to form an outer frame and an inner frame, the inner surface of said inner frame presenting a complete smooth and unbroken guide passage for the ammunition material, the outer frame having at the top and bottom a centrally positioned element extending from one end thereof, each of said elements being inwardly curved to form a hook, the inner frame having at the top and bottom an inwardly recessed loop-shaped extension in continued alignment with one of the elements thereof for receiving the elements of the next following link, the inner side wall of each link being extended endwise to overlap the inner side wall of the next following link.

ELMAR KOLEHMAINEN.

REFERENCES CITED

The following references are of record in the file of this patent:

UNITED STATES PATENTS

| Number | Name | Date |
| --- | --- | --- |
| 2,449,849 | Holmes | Sept. 21, 1948 |
| 2,473,716 | Lewis et al. | June 21, 1949 |